(12) United States Patent
Shirrell

(10) Patent No.: US 8,173,745 B2
(45) Date of Patent: May 8, 2012

(54) COMPOSITIONS USEFUL FOR PREPARING COMPOSITES AND COMPOSITES PRODUCED THEREWITH

(75) Inventor: Charles David Shirrell, Katy, TX (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 278 days.

(21) Appl. No.: 12/639,726

(22) Filed: Dec. 16, 2009

(65) Prior Publication Data

US 2011/0144272 A1    Jun. 16, 2011

(51) Int. Cl.
   B32B 27/04    (2006.01)
   B32B 27/38    (2006.01)
   C08K 5/07     (2006.01)
   C08L 63/00    (2006.01)
   C08L 63/02    (2006.01)
   C08L 63/04    (2006.01)

(52) U.S. Cl. ............... 525/109; 428/297.4; 428/413; 523/427; 523/434; 525/481; 525/507

(58) Field of Classification Search ............ None
   See application file for complete search history.

(56) References Cited

U.S. PATENT DOCUMENTS

| | | | |
|---|---|---|---|
| 3,434,087 A | | 3/1969 | Hofmann |
| 4,268,810 A | | 5/1981 | Iwasa et al. |
| 4,394,497 A | | 7/1983 | Nelson et al. |
| 4,501,787 A | | 2/1985 | Marchetti et al. |
| 4,663,400 A | | 5/1987 | Wang et al. |
| 4,710,429 A | | 12/1987 | Bogan et al. |
| 4,764,571 A | | 8/1988 | Namba et al. |
| 4,792,479 A | | 12/1988 | Marchetti et al. |
| 5,677,397 A | | 10/1997 | Nakamura et al. |
| 6,005,064 A | | 12/1999 | Hirai et al. |
| 6,133,377 A | * | 10/2000 | Nakamura et al. ............ 525/109 |
| 6,197,425 B1 | | 3/2001 | Sekimoto et al. |
| 6,214,468 B1 | | 4/2001 | Takano et al. |
| 6,288,169 B1 | | 9/2001 | Usui et al. |
| 6,518,331 B2 | | 2/2003 | Sekimoto et al. |
| 6,586,526 B1 | | 7/2003 | Sekimoto et al. |
| 6,596,813 B2 | | 7/2003 | Usui et al. |
| 6,962,957 B2 | | 11/2005 | Usui et al. |
| 2002/0001720 A1 | | 1/2002 | Clough |
| 2006/0135710 A1 | | 6/2006 | Shirrell |
| 2009/0004484 A1 | * | 1/2009 | Kim et al. .............. 428/436 |

FOREIGN PATENT DOCUMENTS

| | | |
|---|---|---|
| EP | 0 623 633 A2 | 11/1994 |
| EP | 0 685 766 B1 | 12/1995 |
| JP | 59155043 A2 | 9/1984 |
| JP | 59155044 A2 | 9/1984 |
| JP | 61026654 | 2/1986 |
| JP | 62101627 | 5/1987 |
| JP | 07188516 | 7/1995 |
| JP | 07304854 | 11/1995 |
| JP | 9-278867 | 10/1997 |
| JP | 11-21422 | 1/1999 |
| JP | 11-21429 | 1/1999 |
| JP | 11060683 | 3/1999 |
| JP | 11097588 | 4/1999 |
| JP | 2001-206931 | 7/2001 |
| JP | 61188465 | 12/2003 |
| KR | 10-2007-0005378 | 10/2007 |
| WO | WO91/03448 | 3/1991 |
| WO | WO91/04512 | 4/1991 |

OTHER PUBLICATIONS

CAPLUS accession No. 2007:742829 and Derwent accession No. 2007-671991 for Korean Patent No. 2007-5378, Kim et al., Jan. 10, 2007, three pages.*
H. Teratani et al., Mitsubishi Electr. Corp.; Proc. Electr./Electron. Insul. Conf., 12th (1975), 197-201 Publisher: IEEE, New York, N.Y. (Abstract Only).

* cited by examiner

*Primary Examiner* — Robert Sellers

(57) ABSTRACT

A composite prepared using a thermosettable epoxy resin composition having, as components: (1) an epoxy resin; (2) an epoxidized cycloaliphatic dicyclopentadiene phenolic resin; (3) an optional epoxidized bisphenol-A novolac resin; (4) an optional oligomeric butadiene; (5) an optional organic solvent; and (6) an alkylphenol novolac resin, the alkylphenol novolac resin serving as a curing agent. The composite so prepared may have good physical properties and superior a electrical properties as compared to conventional composites, such as laminates. The prepregs used to make the laminates may have a better surface appearance as well.

19 Claims, 4 Drawing Sheets

COMPOSITIONS USEFUL FOR PREPARING COMPOSITES AND COMPOSITES PRODUCED THEREWITH

BACKGROUND OF THE INVENTION

1. Field of the Invention

The invention relates to compositions useful in the manufacture of composites, and especially prepregs, used in the preparation of composite structures, such as laminates. The invention particularly relates to compositions including epoxidized dicyclopentadiene and their use in preparing prepregs.

2. Background of the Invention

Laminates are generally manufactured by pressing, under elevated temperatures and pressures, various layers of partially cured "prepregs". These prepregs are generally manufactured by impregnating a thermosettable epoxy resin composition into a porous substrate, such as a glass fiber mat, followed by processing at elevated temperatures to promote a partial cure of the epoxy resin in the mat to a "B-stage." Complete cure of the epoxy resin impregnated in the glass fiber mat typically occurs during the lamination step when the prepreg layers are again pressed under elevated temperatures for a sufficient time.

Epoxy resin systems having a high Glass Transition Temperature ($T_g$) are often desirable in the manufacture of prepregs and the laminates prepared therewith. Such systems may offer, for example, improved heat resistance and reduced thermal expansion. These properties along with low Dielectric Constant ($D_k$), and Dissipation frequencies ($D_f$) above 1.0 GHz may be required for applications such as complex printed circuit board circuitry and for higher fabrication and usage temperatures.

SUMMARY OF THE INVENTION

In one aspect, the invention is a composite prepared using a thermosettable epoxy resin composition having, as formulation components: (1) an epoxy resin; (2) an epoxidized cycloaliphatic dicyclopentadiene phenolic resin; (3) an optional epoxidized bisphenol-A novolac resin; (4) an optional oligomeric butadiene; (5) an optional organic solvent; and (6) an alkylphenol novolac resin, the alkylphenol novolac resin serving as a curing agent, wherein, the formulation components, when cured, have a $D_f$ of about 0.023 or less at 1 GHz and a $D_k$ of about 3.2 or less at 1 GHz.

In another aspect the invention is a prepreg, or a laminate including a prepreg, prepared using a thermosettable epoxy resin composition having, as formulation components: (1) an epoxy resin; (2) an epoxidized cycloaliphatic dicyclopentadiene phenolic resin; (3) an optional epoxidized bisphenol-A novolac resin; (4) an optional oligomeric butadiene; (5) an optional organic solvent; and (6) an alkylphenol novolac resin, the alkylphenol novolac resin serving as a curing agent wherein, the formulation components, when cured, have a $D_f$ of about 0.023 or less at 1 GHz and a $D_k$ of about 3.2 or less at 1 GHz.

BRIEF DESCRIPTIONS OF THE DRAWINGS

The advantages and further aspects of the disclosure will be readily appreciated by those of ordinary skill in the art as the same becomes better understood by reference to the following detailed description when considered in conjunction with the accompanying figures.

DETAILED DESCRIPTION

Figure 1:
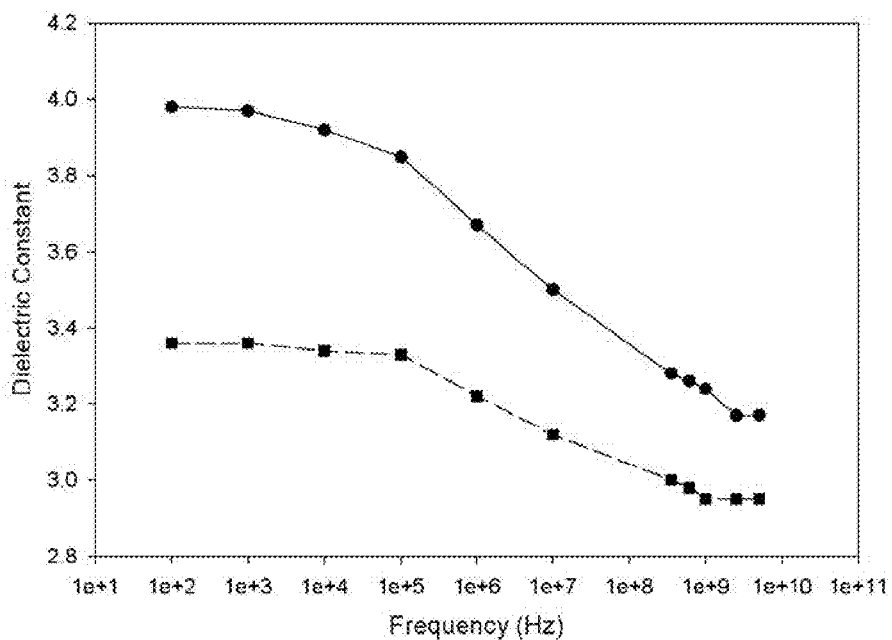
FIG. 1 is a plot of dielectric constant as a function of frequency for Examples 1 and 2.

In the practice of at least one embodiment of the invention, a laminate is prepared using a thermosettable epoxy resin composition having, as components: (1) an epoxy resin; (2) an epoxidized cycloaliphatic dicyclopentadiene phenolic resin; (3) an optional epoxidized bisphenol-A novolac resin; (4) an optional oligomeric butadiene; (5) an optional organic solvent; and (6) an alkylphenol novolac resin, the alkylphenol novolac resin serving as a curing agent.

Epoxy Resin Component

Epoxy resins are those resins containing at least one vicinal epoxy group. The epoxy resins useful as components of the thermosettable epoxy resin composition of the disclosure may be saturated or unsaturated, aliphatic, cycloaliphatic, aromatic or heterocyclic, and may be substituted with alkyl and other moieties. The epoxy resin component may also be monomeric or polymeric.

The epoxy resin component utilized may be, for example, an epoxy resin or a combination of epoxy resins prepared from an epihalohydrin and a phenol or a phenol type compound, prepared from an epihalohydrin and an amine, prepared from an epihalohydrin and an a carboxylic acid, or prepared from the oxidation of unsaturated compounds.

In one embodiment, the epoxy resins utilized in the compositions of the application include those resins produced from an epihalohydrin and a phenol or a phenol type compound. The phenol type compounds include compounds having an average of more than one aromatic hydroxyl group per molecule. Examples of phenol type compounds include, but are not limited to dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins or combinations thereof.

In another embodiment, the epoxy resin components utilized in the compositions of the disclosure may desirably include those resins produced from an epihalohydrin and bisphenols, halogenated bisphenols, hydrogenated bisphenols, novolac resins, and polyalkylene glycols or combinations thereof.

In still another embodiment, the epoxy resin components utilized in the thermosettable epoxy resin compositions of the disclosure may include those resins produced from an epihalohydrin and resorcinol, catechol, hydroquinone, biphenol, bisphenol-A, bisphenol-AP (1,1-bis(4-hydroxyphenyl)-1-phenyl ethane), bisphenol F, bisphenol K, tetrabromobisphenol-A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol-A, or combinations thereof.

In an embodiment that may have fire retardant properties, the epoxy resin component may include a halogenated epoxy resin, an in-situ halogenated epoxy resin or a combination thereof. In some embodiments, the halogen is desirably bromine. In-situ bromination may be performed, for example, utilizing in combination an epoxy resin and a brominated phenol, such as, for example, tetrabrominated bisphenol-A (TBBPA). The amount of bromine in the system may be adjusted such that the total burn time of a laminate produced, as measured by Underwriter Laboratories test UL94, is between about 2 to about 50 seconds. In some embodiments, the total burn time is from about 10 to about 50 seconds and in other embodiments, from about 15 to about 30 seconds. All individual UL94 test specimen burn times were less than 10 seconds. The epoxy resin component may include a resin prepared from an epihalohydrin and a phenol or a phenol type compound utilized in combination with a brominated epoxy resins or an in-situ brominated epoxy resin.

In another embodiment, the epoxy resin component includes a mixture of an epoxy resin and a flame retarded additive and phenolic hydroxyl groups. The flame retardant additive may or may not contain a halogen. Suitable examples of halogenated flame retardant additives include, but are not limited to, tetrabromobisphenol-A (TBBPA), epoxidized TBBPA and its oligomers (EPON Resin 1163), tetrachlorobisphenol-A (TCBPA), epoxidized TCBPA and its oligomers, brominated and chlorinated novolacs, bromophenol & chlorophenol, dibromophenol & dichlorophenol, 2,4,6-Tribromophenol and 2,4,6-Trichlorophenol, halogenated β-lactones, chlorendic anhydride [1,4,5,6,7,7-hexachlorobicyclo[2.2.1]-5-heptane-2,3-dicarboxylic acid], chlorinated waxes, tetrabromophthalic anhydride, oligomeric brominated polycarbonates and combinations thereof.

Suitable examples of non-halogenated flame retardant additives include, but are not limited to aluminum oxide hydrates, aluminum carbonates, magnesium hydroxides, vitrifying borates and phosphates, red phosphorous, phosphoric acid esters, phosphonic acid esters, phosphines, phosphinates, phosphonates, melamine resins (melamine cyanurates and melamine cyanurates), triphenyl phosphates diphenyl phosphates, polyamine 1,3,5-tris(3-amino-4-alkylphenyl)-2,4,6-trioxohexahydrotriazine, epoxy group containing glycidyl phosphate or glycidyl phosphinate, dihydro-9-oxa-10-phosphapheneantrene-10-oxide and its epoxidized variants, antimony trioxide, zinc borate and combinations thereof.

In another embodiment, the epoxy resin components utilized in the thermosettable epoxy resin composition of the present application include those resins produced from an epihalohydrin and an amine. Suitable amines may include diamino diphenylmethane, aminophenol, xylene diamine, anilines, and the like, or combinations thereof. In another embodiment, the epoxy resins utilized in the embodiments of the disclosure include those resins produced from an epihalohydrin and a carboxylic acid. Suitable carboxylic acids may include phthalic acid, isophthalic acid, terephthalic acid, tetrahydro- and/or hexahydrophthalic acid, endomethylene tetrahydrophthalic acid, isophthalic acid, methyl hexahydrophthalic acid, and the like or combinations thereof.

In another embodiment, the epoxy resin components utilized include those resins produced from an epihalohydrin and compounds having at least one aliphatic hydroxyl group. In this embodiment, it is understood that such resin compositions produced contain an average of more than one aliphatic hydroxyl groups. Examples of compounds having at least one aliphatic hydroxyl group per molecule include aliphatic alcohols, aliphatic diols, polyether diols, polyether triols, polyether tetrols, any combination thereof and the like. Also suitable are the alkylene oxide adducts of compounds containing at least one aromatic hydroxyl group. In this embodiment, it is understood that such resin compositions produced contain an average of more than one aromatic hydroxyl groups. Examples of oxide adducts of compounds containing at least one aromatic hydroxyl group per molecule may include, but are not limited to, ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or combinations thereof.

In another embodiment the epoxy resin component may be an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon. A carboxyl substituted hydrocarbon which is described herein as a compound having a hydrocarbon backbone, preferably a $C_1$-$C_{40}$ hydrocarbon backbone, and one or more carboxyl moieties, preferably more than one, and most preferably two. The $C_1$-$C_{40}$ hydrocarbon backbone may be a straight- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, VERSATIC™ acids, available from Hexion Specialty Chemicals, Inc., Houston, Tex., and decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In still another embodiment, the epoxy resin component may be the reaction product of a polyepoxide and a compound containing more than one isocyanate moiety or a polyisocyanate. In some embodiments, the epoxy resin that may be produced in such a reaction is an epoxy-terminated polyoxazolidone.

The epoxy resin component of the composition useful for preparing laminates is present as a weight percentage (wt %) of all components of the composition of from about 30 wt % to about 80 wt % percent. In some embodiments, the epoxy resin component is present as a weight percentage of all components of the composition of from about 50 wt % to about 80 wt % and in other embodiments it is present in a range of from about 60 wt % to about 80 wt %.

The preparation of epoxy resin compounds is well known in the art. Examples of epoxy resins and their precursors suitable for use in the compositions of some embodiments of the invention are also described, for example, in U.S. Pat. Nos. 5,137,990 and 6,451,898 which are fully incorporated herein by reference.

Epoxidized Cycloaliphatic Dicyclopentadiene Phenolic Resin

The second component of the thermosettable epoxy resin composition useful for preparing laminates is an epoxidized cycloaliphatic dicyclopentadiene phenolic resin. The epoxidized cycloaliphatic dicyclopentadiene phenolic resins utilized in the compositions may include those resins produced from an epihalohydrin and a dicyclopentadiene polyphenolic compound having the general formula:

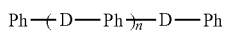

wherein "n" represents a whole number from 0 to 7; Ph is a phenylol radical derived from mononuclear phenol, and D is a tricyclodecylene radical having a general formula:

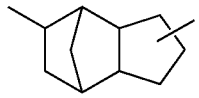

which may be methylated. In some embodiments, n is a whole number of from 0 to 3.

In at least one embodiment, phenol is used to prepare the tricyclodecylene radical while in others the phenylol radical may contain other organic constituent groups. The tricyclodecylene radical may be prepared by conversion of mononuclear phenols which possess at least one free ortho- and/or para-position relative to a phenolic hydroxyl group, with a dicyclopentadiene. Suitable phenols useful for this may include, for instance, phenol, o-, m-, and p-cresol, 3,4- and 3,5-dimethylphenol, the various alkyl phenols with in general not more than 15 carbon atoms per alkyl group, resorcinol, and mixtures of two or more phenols such as technical cresol.

In some embodiments, the dicyclopentadiene used to prepare the tricyclodecylene radical may be unsubstituted dicyclopentadiene. In other embodiments, a dimer of cyclopentadiene or a co-dimer of cyclopentadiene and methylcyclopentadiene may be so used.

The molar ratio in which the phenol and the dicyclopentadiene are caused to react may be between 1.5:1 and 15:1. In some embodiments of the application, the ratio may be between 4:1 and 10:1. Under the latter conditions the value of the number n in the aforementioned formula will usually equal zero.

The preparation of epoxidized cycloaliphatic dicyclopentadiene phenolic resin is well known in the art. Examples of such resins and their precursors suitable for use in the compositions of some embodiments of the invention are also described, for example, in U.S. Pat. No. 3,536,734, which is fully incorporated herein by reference.

The epoxidized cycloaliphatic dicyclopentadiene phenolic resin may be present in a range of from about 5 wt % to about 70 wt % as a weight percentage of all components of the composition. In some embodiments, the epoxidized cycloaliphatic dicyclopentadiene phenolic resin is present from about 15 wt % to about weight 60 wt %, and in other embodiments it is present in a range of from about 20 wt % to about 40 wt %, based upon the weight of all components of the composition.

Epoxidized Bisphenol-A Novolac Component

The epoxidized bisphenol-A novolac resin component of the application contains at least three novolac epoxide groups per molecule. Exemplary compounds include, but are not limited to epoxidized phenolic novolacs, epoxidized o-cresol novolacs, epoxidized bisphenol of acetone novolacs and the like. These epoxy resins may be used alone or in an admixture of two or more. This optional component, when present, may be present from about 10 wt % to about 40 wt % as a weight percentage of all components in the composition. In some embodiments, the epoxidized bisphenol-A novolac resin component may be present in a range of from about 10 wt % to about 20 wt %.

Oligomeric Butadiene Component

The optional oligomeric butadiene component is a homopolymer of butadiene having a molecular weight (Mw) of from about 1,000 to about 20,000 Daltons. In some embodiments, this homopolymer will have a 1, 2 vinyl group content of at least 25%. In some embodiments, the 1, 2 vinyl group content may be from 25 to about 99 percent and, in other embodiments, from about 5 to about 99 percent. The optional homopolymer component may be present, if present at all, in the thermosettable epoxy resin composition of the disclosure useful for preparing laminates at a concentration of from about 0.05 wt % to about 4 wt % as a weight percentage of all components in the composition. In some embodiment, this range may be from about 0.1 wt % to about 1.5 wt %, and in other embodiments, the range may be from about 0.2 wt % to about 1.0 wt % as a weight percentage of all components in the composition. This homopolymers may be prepared using any method known to be useful to those of ordinary skill in the art of preparing homopolymers of butadiene.

Organic Solvent Component

At least one solvent may optionally be used to prepare the thermosettable epoxy resin composition of the disclosure. In many embodiments, the solvent will be present at a weight concentration of from about 15 to about 50 wt % based upon the weight of all formulation components. The solvent or solvents may be present at a concentration of from about 20 to 40 wt % is some embodiments. Those of ordinary skill in the art of preparing laminates will well know how to select suitable solvents and what concentration of solvent to use for their particular applications.

Suitable solvents useful as the solvent component in some embodiments of the disclosure may include ketones, alcohols, glycol ethers, aromatic hydrocarbons and mixtures thereof. Other solvents which may be used with the process of the disclosure include, but are not limited to methyl ethyl ketone, methyl isobutyl ketone, propylene glycol methyl ether, ethylene glycol methyl ether, methyl amyl ketone, methanol, isopropanol, toluene, xylene, dimethylformamide and the like. A single solvent may be used, but in many embodiments, different solvents may be used for one or more of the components. For example, suitable solvents for the epoxy resin components may be ketones. Suitable solvents for the curing agent components detailed below may include, for example, ketones, amides such as dimethylformamide (DMF), ether alcohols such as methyl, ethyl, propyl or butyl ethers of ethylene glycol, diethylene glycol, propylene glycol or dipropylene glycol, ethylene glycol monomethyl ether, or 1-methoxy-2-propanol.

Alkylphenol Novolac Curing Agent Component

The thermosettable epoxy resin composition of the disclosure may include a substituted novolac curing agent or a blend of differently substituted novolac curing agents, each represented by the general formula:

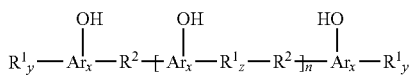

where: Ar represents an aryl or alkyl-aryl group; each Ar group contains x number of non-aromatic carbon atoms, OH represents a hydroxyl group bonded to each Ar group, $R^1$ represents substituent group(s) bonded to each Ar group, each $R^2$ represents a group connecting adjacent Ar groups, n is a number between 2 and 20, x is an integer from 4 to 8, y is an integer from 1 to x-2, and z is an integer from 1 to x-3.

In this general formula, each Ar may be the same or different and contains 5 to 7 carbon atoms and more preferably contains 6 carbon atoms; each $R^1$ may be the same or different and is an alkyl group or aryl group containing 2 to 20 carbon atoms, more preferably containing 4 to 9 carbon atoms and most preferably selected from a butyl, octyl or phenyl group; each $R^2$ may be the same or different and is an alkyl group, more preferably an alkyl group containing 1 to 5 carbon atoms, and most preferably a methyl or ethyl group; n is a number from 2 and 20 and preferably from 4 and 20.

In one embodiment, the curing agent may be a substituted novolac curing agent or a blend of differently substituted novolac curing agents each represented by the general formula:

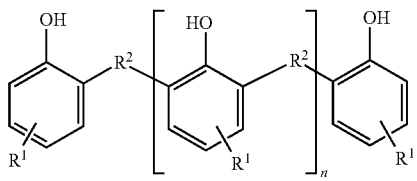

wherein R', $R^2$ and n are defined as above. And some embodiments, $R^1$ represents a single alkyl substituent in the para position having from 4 to 9 carbon atoms and is sometimes a butyl or octyl group. In one embodiment, $R^2$ is desirably in a methylene group.

In another embodiment, the substituted novolac curing agent is selected from octyl-phenol novolac, nonyl-phenol novolac, phenyl phenol novolac, t-butyl-phenol novolac, cardanol novolac, and combinations thereof. In a preferred embodiment the curing agent comprises a combination of octyl phenol novolac and butyl novolac.

In another embodiment, the substituted novolac curing agent comprises a co-novolac compound wherein $R^1$ represents a different alkyl groups on the same molecule. In this embodiment each $R^1$ is preferably an alkyl group, having from 4 to 15 carbon atoms, and is more preferably a butyl or octyl group. In a preferred embodiment, the curing agents comprise a co-novolac containing octyl and butyl substituent groups. In still another embodiment, the curing agent could comprise a co-novolac containing either phenol or bisphenol-A and an alkyl phenol.

In another embodiment, and in addition to the above, the substituted novolac curing agent comprises a compound wherein the weight average molecular weight (Mw) of the substituted novolac curing agent is less than 4000, sometimes less than 3000 and in other embodiments between about 1000 and 4000, sometimes between about 1500 and 3000, and sometimes between about 1600 to 2700.

In yet another embodiment, the substituted novolac curing agent of the invention is utilized in combination with other curing agents known in the art such as for example, with unsubstituted phenol curing agents, or an amine- or amide-containing curing agent. Suitable unsubstituted phenol curing agents may include dihydroxy phenols, biphenols, bisphenols, halogenated biphenols, halogenated bisphenols, hydrogenated bisphenols, trisphenols, phenol-aldehyde resins, phenol-aldehyde novolac resins, halogenated phenol-aldehyde novolac resins, phenol-hydrocarbon resins, phenol-hydroxybenzaldehyde resins, alkylated phenol-hydroxybenzaldehyde resins, hydrocarbon-phenol resins, hydrocarbon-halogenated phenol resins, or combinations thereof. In some embodiments, the unsubstituted phenolic curing agent includes unsubstituted phenols, biphenols, bisphenols, novolacs or combinations thereof.

The ratio of curing agent to epoxy resin may be suitable to provide a fully cured resin. The amount of curing agent which may be present may vary depending upon the particular curing agent used (due to the cure chemistry and curing agent equivalent weight as is well known in the art). In one embodiment, the ratio of total epoxy groups to the phenolic hydroxyl equivalents may be between about 0.5 to about 1.5, sometimes between about 0.6 to about 1.2, and sometimes between about 0.8 to about 1.0.

Accelerator Component

Optional accelerators useful in the compositions of the invention include those compounds which catalyze the reaction of the epoxy resin with the curing agent.

In one embodiment, the accelerators are compounds containing amine, phosphine, heterocyclic nitrogen, ammonium, phosphonium, arsonium or sulfonium moieties. More preferably, the accelerators are heterocyclic nitrogen and amine-containing compounds and even more preferably, the accelerators are heterocyclic nitrogen-containing compounds.

In another embodiment, the heterocyclic nitrogen-containing compounds useful as accelerators include heterocyclic secondary and tertiary amines or nitrogen-containing compounds such as, for example, imidazoles, imidazolidines, imidazolines, bicyclic amidines, oxazoles, thiazoles, pyridines, pyrazines, morpholines, pyridazines, pyrimidines, pyrrolidines, pyrazoles, quinoxalines, quinazolines, phthalazines, quinolines, purines, indazoles, indazolines, phenazines, phenarsazines, phenothiazines, pyrrolines, indolines, piperidines, piperazines, as well as quaternary ammonium, phosphonium, arsonium or stibonium, tertiary sulfonium, secondary iodonium, and other related "onium" salts or bases, tertiary phosphines, amine oxides, and combinations thereof. Imidazoles as utilized herein include imidazole, 1-methylimidazole, 2-methylimidazole, 4-methylimidazole, 2-ethylimidazole, 2-ethyl-4-methylimidazole, 2-phenylimidazole, 2-undecylimidazole, 1-benzyl-2-methylimidazole, 2-heptadecyl imidazole, 4,5-diphenylimidazole, 2-isopropylimidazole, 2,4-dimethyl imidazole, 2-phenyl-4-methylimidazole, 1-cyanoethyl-2-ethyl-4-methylimidazole and the like. Preferred imidazoles include 2-methylimidazole, 2-phenylimidazole and 2-ethyl-4-methylimidazole.

Imidazolines as utilized herein include 2-methyl-2-imidazoline, 2-phenyl-2-imidazoline, 2-undecylimidazoline, 2-heptadecylimidazoline, 2-isopropylimidazole, 2,4-dimethyl imidazoline, 2-phenyl-4-methylimidazoline, 2-ethylimidazoline, 2-isopropylimidazoline, 4,4-dimethyl-2-imidazoline, 2-benzyl-2-imidazoline, 2-phenyl-4-methylimidazoline and the like.

Among preferred tertiary amines that may be used as accelerators are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanolamine, triethylamine, tributylamine, benzyldimethylamine, tricyclohexyl amine, pyridine, quinoline, and the like. Preferred amines are the trialkyl and tricycloalkyl amines, such as triethylamine, tri(2,3-dimethylcyclohexyl) amine, and the alkyl dialkanol amines, such as methyl diethanolamine and the trialkanolamines such as triethanolamine. Weak tertiary amines, e.g., amines that in aqueous solutions give a pH less than 10, are particularly preferred. Especially preferred tertiary amine accelerators are benzyldimethylamine and tris-(dimethylaminomethyl)phenol.

The amount of accelerator present may vary depending upon the particular curing agent used (due to the cure chemistry and curing agent equivalent weight as is known in the art).

Use in Laminates

Laminates may be prepared using the thermosettable epoxy resin compositions of the disclosure by contacting the compositions with porous substrates. The contacting may be performed using any method known to those skilled in the art. Examples of such contacting methods include powder coating, spray coating, die coating, coating and contacting the laminate substrate with a bath containing the composition. In one embodiment, the article is contacted with the composition in a bath.

The epoxy resin compositions described herein may be most commonly found in solution or dispersion. In those embodiments where the various compositions are in solution or dispersion, the various components of the composition may be dissolved or dispersed in the same solvent or may be separately dissolved in a solvent suitable for that component, then the various solutions are combined and mixed. Sometimes, when the epoxy resin composition is in the form of a solution or dispersion, it is referred to as a varnish.

The epoxy resin compositions described herein may optionally contain one or more known fillers in an amount sufficient to provide for enhanced flammability, lowered coefficient of thermal expansion or improved thermal decomposition. The selection and nature of the fillers will vary depending upon the composition formulations as is known in the art. By way of example, such fillers include, but are not limited to, aerogels, alumina, calcium carbonate, clay, crystalline silica, fumed silica, fused silica, glass microspheres (hollow or solid), hydrogels, lyogels, mica, organogels, polymeric microspheres (hollow or solid), spodumene, talc, and the like, including any combination or subset thereof. The fillers, if utilized, are typically present in an amount of between about 5 wt % to about 30 wt %, based upon the weight of all components of the composition, and can vary in mean particle size from about 1 to about 15 microns. Also, by way of example, the filler may be pre-treated prior to their addition to the composition with additives such as adhesion promoters, stabilizers, thickeners and the like as is known in the art. Further, the filler may be utilized in the compositions in conjunction with dispersing or stabilizing agents to maintain a uniform suspension as is known to those skilled in the art.

Laminates, especially printed circuit boards, are required to have good physical properties, while simultaneously having good electrical insulating performance, especially at frequencies of around or above one GHz. Laminates prepared with conventional epoxy resin compositions often do not meet the newer, more stringent, specifications of modern manufacturers. An advantage of the laminates of the disclosure is that they may have balanced properties. That is, they may have the same physical properties as conventional laminates while having better electrical insulating properties.

Printed circuit boards prepared using epoxy resin compositions of the disclosure, have superior electrical performance, when compared to printed circuit boards and using conventional epoxy resin compositions. The physical properties of printed circuit boards of the disclosure are about as good as or even better than conventional printed circuit boards. The balanced properties of the laminates of the disclosure may be advantageous in electrical applications.

Another advantage of laminates prepared using the epoxy resin compositions of the disclosure is that they, in some applications, may have a very smooth appearance. While not wishing to be bound by any theory, it is believed that the oligomeric butadiene component of the epoxy resin compositions of the disclosure is responsible for the improvement. Especially in applications, where there is the possible development of rough surfaces during the prepreg processing, it may be desirable to prepare the laminates with formulations including the optional oligomeric butadiene component.

In addition to high-performance electrical laminates, the resin compositions of the disclosure may find utility in, for example, molding powders, coatings, and structural composite parts fabrication.

In order to provide a better understanding of the present invention including representative advantages thereof, the following examples are offered. However, this invention is by no means limited by these examples.

EXAMPLES

The examples and comparative examples were prepared and tested using the methods shown below.

Dielectric Constant ($D_k$)—For frequencies at or below 10 megahertz (MHz), this measurement was conducted per ASTM (American Society for Testing and Materials) D150, "Standard Test Method for A-C Loss Characteristics and Permittivity (Dielectric Constant) of Solid Electrical Insulating Materials". A parallel-plate fixture having a 1.5 inch diameter guided electrode was utilized to conduct these tests. For frequencies above 10 MHz, this measurement was conducted per ASTM D2520, "Standard Test Methods for Complex Permittivity (Dielectric Constant) of Solids Electrical Insulating Materials at Microwave Frequencies and Temperatures to 1650 Degrees C". Method B, Resonant Cavity Perturbation Technique, was used. The electrical field inside the cavities was parallel to the length of the test samples. The precision of the results was typically +/−1%. In one embodiment, the $D_k$ of the fully cured resin formulation components of the invention as determined in accordance with ASTM D150, at 1 GHz is less than 3.2. In another embodiment, the $D_k$ of the fully cured resin formulation components of the invention as determined in accordance with ASTM D150, at 1 GHz is less than 3.0.

Dissipation Factor ($D_f$)—For frequencies at or below 10 megahertz (MHz), this measurement was conducted per ASTM D150, "Standard Test Method for A-C Loss Characteristics and Permittivity (Dielectric Constant) of Solid Electrical Insulating Materials". A parallel-plate fixture having a 1.5 inch diameter guided electrode was utilized to conduct these tests. For frequencies above 10 MHz, this measurement was conducted per ASTM D2520, "Standard Test Methods for Complex Permittivity (Dielectric Constant) of Solids Electrical Insulating Materials at Microwave Frequencies and Temperatures to 1650 Degrees C". Method B, Resonant Cavity Perturbation Technique, was used. The electrical field inside the cavities was parallel to the length of the test samples. The precision of the results was typically +/−2 to 3%. In one embodiment, the $D_f$ of the fully cured resin formulation components of the invention is about 0.023 or less at 1 GHz. In another embodiment, the $D_f$ of the fully cured resin formulation components of the invention is less than 0.015 at 1 GHz.

Glass Transition Temperature—The Glass Transition Temperature ($T_g$) of the resin in the laminates was measured by Differential Scanning calorimetry (DSC) at a heat-up rate of 20° C./minute from 50° C. to 220° C. followed by rapid cooling and a second identical heating rate scan. The Temperature of the DSC was calibrated using an Indium and a Tin standard. The DSC instrument was a Perkin Elmer DSC Model 7. In one embodiment, the $T_g$ of the fully cured resin formulation components of the invention is greater than 150° C. In another embodiment, the $T_g$ of the fully cured resin formulation components of the invention is greater than 170° C.

Thermal Decomposition Temperature—The Thermal Decomposition Temperature (Td) of the resin in the laminates was measured using thermogravimetric analysis as described in IPC (Institute for Interconnecting and Packaging Electronic Circuits) Test Method IPC-TM-650 2.4.24.6. In one embodiment, the Td of the fully cured resin formulation components of the invention is greater than 300° C.

Weight per Epoxide—The Weight per Epoxide (WPE & also known as the epoxy equivalent weight, EEW) was measured using an industry standard perchloric acid titration method.

Molecular Weight via Gel Permeation Chromatography—The Weight Average Molecular Weight (Mw) herein is measured using size exclusion gel permeation chromatography (GPC) which was calibrated using polystyrene molecular weight standards. A sample is dissolved in tetrahydrofuran and the resulting solution is run through a Hewlett Packard model 1100HPLC.

Prepreg Dust Gel Time—Approximately 0.2 grams of prepreg dust is placed upon the preheated (348° F.) surface of a hot plate that had been treated with a mold release agent. After 10 seconds, to allow the prepreg dust to melt, the mixture was repeatedly stroked to the left and to the right using a 0.5 inch wide preheated stainless steel spatula having a wooden handle. With time, the mixture begins to polymerize and becomes a viscous stringy mass. Eventually, these strings no longer form between the gel plate and the spatula during the stroking process. The time from when the sample was placed upon the gel plate unto when this stringing ceases is considered as the Prepreg Dust Gel Time and it is recorded in seconds. This test was conducted in duplicate.

Prepreg Volatile Content—A 10.2 cm×10.2 cm piece of prepreg is conditioned at 50% Relative Humidity and 25° C. for four hours. It is then weighed to the nearest milligram (W1). The prepreg is hung from a metal hook in a preheated oven at 163° C. for 15 minutes. It is then allowed to cool in a desiccator. The prepreg is then weighed to the nearest milligram (W2). The volatile content of the prepreg is calculated as follows:

Volatile Content, wt %=((W1−W2)×100)/W1

Resin Content—The Resin Content of the prepreg was measured using the procedures in IPC Test Method IPC-TM-650 2.3.16.2, "Treated Weight of Prepreg".

Resin Flow—The Resin Flow of the prepreg was measured using the procedures in IPC Test Method IPC-TM-650 2.3.17, "Resin Flow Percent of Prepreg".

Varnish Gel Time—Three milliliters of an epoxy varnish formulation were placed on the surface of a preheated (348° F.) hot plate that had been treated with a mold release agent. After 15 seconds, to allow the majority of the organic solvent(s) to evaporate, the mixture was repeatedly stroked to the left and to the right using a 0.5 inch wide preheated stainless steel spatula having a wooden handle. With time, the mixture begins to polymerize and becomes a viscous stringy mass. Eventually, these strings no longer form between the gel plate and the spatula during the stroking process. The time from when the sample was placed upon the gel plate unto when this stringing ceases is considered as the Varnish Gel Time and it is recorded in seconds.

Comparative Example 1

Conventional Lead-Free High $T_g$ Laminating Resin

This example provides a typical resin formulation; Prepregging characteristics; and, laminate and neat resin properties for a state-of-the-art, lead-free solder processable, high Glass Transition Temperature ($T_g$) epoxy laminating resin. It is presented as the basis for comparison with the proposed formulation improvements provided in this patent.

A varnish composition was prepared using an epoxidized phenolic Novolac resin dissolved in Acetone (having a WPE of 176 to 181 available from Hexion Specialty Chemicals as EPON Resin 154-A-80. This solution was 80% by weight EPON Resin 154 and 20% by weight Acetone.), an epoxidized multifunctional resin (having a WPE of 200 to 240 available from Hexion Specialty Chemicals as EPON Resin 1031), and a Diglycidyl ether from epichlorohydrin and Tetrabromobisphenol of Acetone (having a WPE from 380 to 410 and containing 50 wt % Bromine available from Hexion Specialty Chemicals as EPON Resin 1163). To this resin mixture was added a phenolic Novolac (with a Weight Average Molecular Weight, Mw of 1610, as measured using Gel Permeation Chromatography (GPC), and residual monomer content of less than 0.2 wt %) available from Hexion Specialty Chemicals as SD-1702. The phenolic Novolac was allowed to completely dissolve, at ambient temperature with mechanical agitation, into the resin solution. A solution of 10 wt % 2-Methylimidazole (2MI) and 90 wt % 1-Methoxy-2-propanol (Propylene Glycol Monomethyl Ether, PGME) was then added into the previously made resin solution. 2MI is a curing accelerator for the epoxide-phenolic reaction of the formulations used in these examples. The gel time of this reactive varnish was 191 seconds at 171° C.

This varnish was used to impregnate 33 cm×33 cm pieces of woven glass cloth (glass cloth style 7628 with glass binder type 643 available from BGF Industries Inc.). This material is an industrial grade fiberglass cloth commonly utilized in the electrical laminating industry.

A pre-measured quantity of the varnish solution was applied to the fiberglass cloth manually and the varnish was uniformly distributed and worked into the fiberglass cloth using a paintbrush. The resulting varnish impregnated fiberglass cloth was hung in an air-circulating oven at 165° C. to remove its volatile solvents and to partially cure the varnish's reactive components. Each sheet of prepreg was kept in the air-circulating oven for typically 3.75 minutes. This laboratory prepreg preparation process emulates the commercial manufacturing of industrial electrical laminating prepregs.

The surface appearance of this laboratory prepared prepreg was visually judged to be excellent. It was transparent, shiny and contained no surface defects such as craters, pinholes, "orange peel" or resin sags. The resin content of these prepregs was between 41 and 44 wt % (for those used in making laminates) and between 45 and 50 wt % (for those used in making prepreg dust for neat castings). The volatile content of both types of prepregs were less than 0.2 wt %. The prepregs that were used for preparing resin dust, as described in the following paragraph, had oven times greater than 3.75 minutes to provide for enhanced resin flow that is required to yield void free resin castings.

After allowing the prepreg to cool to room temperature, the partially cured resin in the prepreg sheets with high resin content was subjected to mechanical abrasion to physically remove it from the fiberglass cloth. Any remaining glass fibers in this prepreg dust were then separated from the partially cured resin dust. A selected amount of this prepreg dust was placed into a rectangular cavity mold and it was inserted between temperature controlled platens of a laboratory press (Tetrahedron Associates, Incorporated, model 1402). The polymerization of the neat resin prepreg dust was completed using the following cure cycle:
(1) apply 0.64 MPa pressure to the mold;
(2) increase the temperature of the mold from room temperature to 182.2° C. at 11.1° C. per minute; upon reaching 193.3° C., hold at this temperature for 1.5 hours;
(3) cool under pressure from 193.3° C. to 40.6° C. at 5.6° C. per minute; and
(4) release the pressure and remove the cured neat resin casting from the mold.

Fiberglass laminates were also made from this prepreg, curing them in a similar manner, by placing an eight ply stack of these prepregs between the temperature controlled platens of this press. However, the heat-up rate used for curing laminates was 5.6° C. per minute in step 1 of the above curing cycle and its cool-down rate was 11.1° C. per minute in step 2 above.

Figure 2:
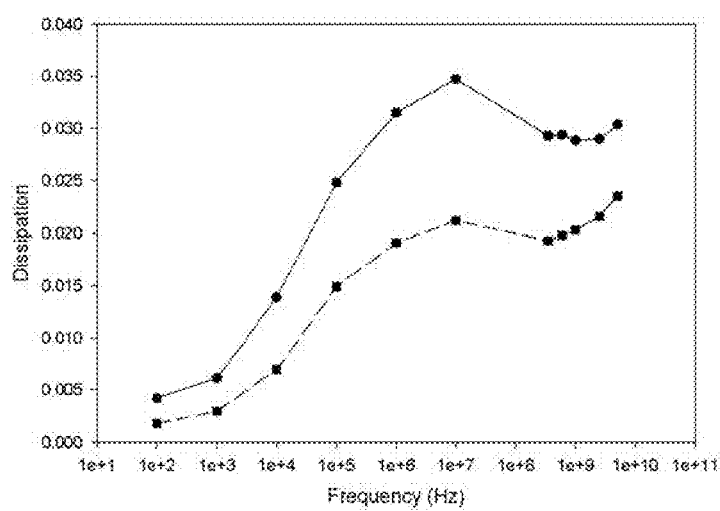
FIG. 2 is a plot of dissipation as a function of frequency for Examples 1 and 2.

The composition of this formulation, its prepreg characteristics and laminate properties can be found in Table 1. The dielectric constant and dissipation of this resin's neat casting was measured at room temperature using the methods described earlier in this section. These measured values can be found in Table 2 and FIGS. 1 and 2 (solid circles).

This example provides a representative illustration of the current state-of-the-art, lead-free, high $T_g$ epoxy laminating resin.

Example 2

Improved Electrical Performance Lead-Free Processable

Figure 3:
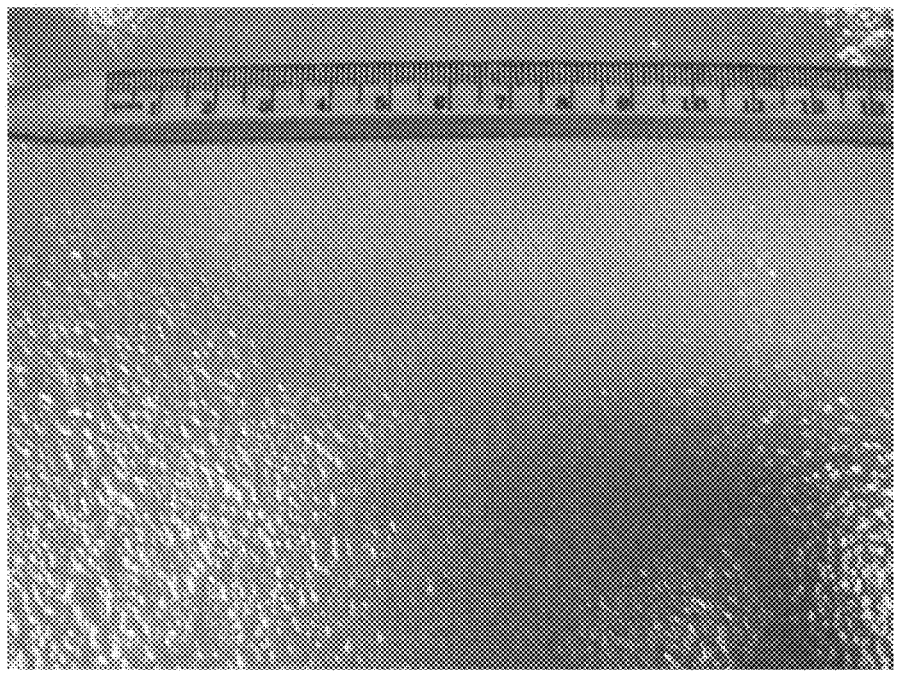
FIG. 3 is a photograph of the surface of a prepreg made using Example 2.

High $T_g$ Laminating Resin using a Medium Molecular Weight Epoxidized DCPD Phenol Novolac The varnish composition of Example 2 was prepared from its components according to Table 1 and the procedures described in Example 1. This varnish was prepared using an Epoxidized Dicyclopentadiene (DCPD) Phenol resin that had a WPE of 278 and a weight average molecular weight, Mw, of 1040; EPON Resin 1031; and, EPON Resin 1163 was then also added and all were dissolved in Methyl Ethyl Ketone (MEK) at room temperature. To this homogenous epoxy resin solution was added, with stirring at room temperature, 4-(1,1,3,3-tetramethylbutyl)phenol Novolac [commonly designated as Octylphenol Novolac] curing agent that had a Phenolic equivalent weight of 215, a molecular weight, Mw, of 1715 and a residual 4-(1,1,3,3-tetramethylbutyl)phenol content of less than 0.4 wt %. Additionally, a high boiling solvent, PGME, was added concurrently. The Novolac was allowed to completely dissolve into the resin solution. A 10% 2MI/90% PGME solution (to function as a curing accelerator) was then added to the varnish solution with stirring. The gel time of the resulting varnish solution was 213 seconds at 171° C. As described in Example 1, this varnish solution was then used to impregnate fiberglass cloth. Each sheet of this prepreg was placed in an air-circulating oven for 4.5 minutes. The surface appearance of the resulting prepregs was judged to be fair/marginal containing some craters and some surface roughness. FIG. 3 illustrates the surface appearance of a typical area of this prepreg. Note that this example was prepared using no oligomeric polybutadiene and thus has a rough surface appearance. A laminate was then prepared from these prepregs and its properties can be found in Table 1. These prepregs were observed to be more latent in reactivity, with a resulting increase in their ease of processability, as compared with conventional Novolac cured, Lead-Free solder processable, high $T_g$ electrical laminating resins.

A cured neat resin casting was prepared from resin dust removed from some of these prepregs and its dielectric constant and dissipation was measured. These measured values can be found in Table 2 and FIGS. 1 and 2 (solid squares).

This example illustrates the use of a medium molecular weight epoxidized DCPD Phenol Novolac in the preparation of an epoxy resin composition for improved Lead-Free solder processable, high $T_g$ electrical laminating resin applications. Its electrical properties ($D_k$ and $D_f$) are superior to those of the Comparative Example 1 while retaining either similar or improved processing and laminate properties.

Example 3

Improved Electrical Performance Lead-Free Processable

High $T_g$ Laminating Resin using a Low Molecular Weight Epoxidized DCPD Phenol Novolac This example illustrates an improved electrical performance Lead-Free Solder processable, high $T_g$ epoxy laminating resin composed, in part, of a low molecular weight epoxidized DCPD Phenol Novolac polymerized using an Octylphenol Novolac curing agent.

A similar varnish formulation as in Example 1 was prepared, using a different epoxidized.

DCPD Phenol Novolac with a WPE of 262 and a Mw value of 523, from its components according to Table 1 and the procedures described in Examples 1 and 2. The gel time of this formulation's varnish solution was 204 seconds at 171° C. As described in Examples 1 and 2, this varnish solution was used to impregnate fiberglass cloth. Each sheet of the resulting prepreg was kept in an air circulating oven for 5.25 minutes. The surface appearance of this prepreg was judged to be fair containing a few craters and a very slight "orange peel". A laminate was then prepared from this prepreg and its properties can be found in Table 1.

This example illustrates the use of a low molecular weight epoxidized DCPD Phenol in the preparation of an epoxy resin composition for improved Lead-Free solder processable, high $T_g$ electrical laminating resin applications. Its properties are similar or superior to those provided in Comparative Example 1.

Example 4

Improved Electrical Performance Lead-Free Processable

High $T_g$ Laminating Resin using a High Molecular Weight Epoxidized DCPD Phenol Novolac This example illustrates an improved electrical performance Lead-Free Solder processable, high $T_g$ epoxy laminating resin composed, in part, of a high molecular weight epoxidized DCPD Phenol Novolac polymerized using an Octylphenol Novolac curing agent.

A similar varnish formulation as in Example 2 was prepared, using another different epoxidized DCPD Phenol Novolac with a WPE of 278 and a Mw value of 1420, from its components according to Table 1 and the procedures described in Examples 1 and 2. The gel time of this formulation's varnish solution was 209 seconds at 171° C. As described in Examples 1 and 2, this varnish solution was used to impregnate fiberglass cloth. Each sheet of the resulting prepreg was kept in an air circulating oven for 5.50 minutes. The surface appearance of this prepreg was judged to be marginal containing many craters and "orange peel". A laminate was then prepared from this prepreg and its properties can be found in Table 1.

This example illustrates the use of a high molecular weight epoxidized DCPD Phenol in the preparation of an epoxy resin composition for improved Lead-Free solder processable, high $T_g$ electrical laminating resin applications. Its properties are similar or superior to those provided in Comparative Example 1.

TABLE 1

Results for Comparative Example 1 Along with Examples Formulated using Varying Molecular Weight Epoxidized DCPD Phenol Novolacs, EPON Resin 1163, EPON Resin 1031 and an Octylphenol Novolac Curing Agent

| | Example Number | | | |
|---|---|---|---|---|
| | 1 | 2 | 3 | 4 |
| Epoxidized DCPD Phenol Novolac | | | | |
| Mw | — | 1040 | 523 | 1420 |
| WPE | — | 272 | 262 | 278 |
| Composition, parts (grams) | | | | |
| EPON Resin 1163 | 30.80 | 28.34 | 28.00 | 28.34 |
| EPON Resin 1031 | 10.22 | 3.26 | 3.00 | 3.25 |
| EPON Resin 154-A-80 | 38.51 | — | — | — |
| Epoxidized DCPD Phenol Novolac Resin | — | 28.54 | 26.71 | 28.54 |
| Phenolic Novolac (Mw = 1540) | 28.17 | — | — | — |
| Octylphenol Novolac (Mw = 1715) | — | 39.86 | 42.29 | 39.88 |
| MEK | — | 22.93 | 26.33 | 21.47 |
| Acetone | 20.85 | 16.77 | 12.49 | 22.76 |
| PGME | 12.21 | 7.26 | 7.31 | 7.26 |
| 10% 2MI/90% PGME | 0.5 | 5.82 | 5.61 | 5.33 |
| Prepreg Characteristics | | | | |
| Varnish Gel Time (seconds) | 191 | 204 | 213 | 209 |
| Oven Time (minutes) | 3.75 | 5.25 | 4.50 | 5.50 |

TABLE 1-continued

Results for Comparative Example 1 Along with Examples Formulated using Varying Molecular Weight Epoxidized DCPD Phenol Novolacs, EPON Resin 1163, EPON Resin 1031 and an Octylphenol Novolac Curing Agent

| | Example Number | | | |
|---|---|---|---|---|
| | 1 | 2 | 3 | 4 |
| Prepreg Appearance | excellent | fair/marginal | fair | marginal |
| Laminates Characteristics | | | | |
| $T_g$ (DSC, 2nd Heat) | 157 | 183 | 173 | 176 |

TABLE 2

A Comparison of the Dielectric Constant and Dissipation of Neat Resin Castings for Comparative Example 1 and Example 2 as Function of Frequency

| | Example Number | | | |
|---|---|---|---|---|
| Frequency | 1 | | 2 | |
| (Hertz) | $D_k$ | $D_f$ | $D_k$ | $D_f$ |
| 100 | 3.98 | 0.0042 | 3.36 | 0.00180 |
| 1000 | 3.97 | 0.0061 | 3.36 | 0.00294 |
| 10000 | 3.92 | 0.0139 | 3.34 | 0.0069 |
| 100000 | 3.85 | 0.0248 | 3.33 | 0.0149 |
| 1000000 | 3.67 | 0.0315 | 3.22 | 0.0191 |
| 10000000 | 3.50 | 0.0347 | 3.12 | 0.0212 |
| 350000000 | 3.28 | 0.0293 | 3.00 | 0.0193 |
| 600000000 | 3.26 | 0.0294 | 2.98 | 0.0198 |
| 1000000000 | 3.24 | 0.0289 | 2.95 | 0.0230 |
| 2500000000 | 3.17 | 0.0290 | 2.95 | 0.0216 |
| 5000000000 | 3.17 | 0.0304 | 2.95 | 0.0235 |

Example 5

Improved Electrical Performance Lead-Free Processable

High $T_g$ Laminating Resin using Epoxidized DCPD Phenol Novolac and a Low Molecular Weight Octylphenol Novolac Curing Agent This example illustrates an improved electrical performance Lead-Free Solder processable, high $T_g$ epoxy laminating resin composed, in part, of an epoxidized DCPD Phenol Novolac polymerized using a low molecular weight Octylphenol Novolac curing agent.

An identical varnish formulation as in Example 2 was prepared, using a different Octylphenol Novolac with a Mw value of 980, from its components according to Table 3 and the procedures described in Examples 1 and 2. The gel time of this varnish solution was 210 seconds at 171° C. As described in Examples 1 and 2, this varnish solution was used to impregnate fiberglass cloth. Each sheet of the resulting prepreg was kept in an air circulating oven for 5.50 minutes. The surface appearance of this prepreg was judged to be fair/marginal containing some craters and "orange peel". A laminate was then prepared from this prepreg and its properties can be found in Table 3.

This example illustrates the use of a low molecular weight Octylphenol Novolac curing agent in the preparation of an epoxy resin composition for Lead-Free solder processable, high $T_g$ electrical laminating resin applications. Its properties are similar or superior to those provided in Comparative Example 1.

Example 6

Improved Electrical Performance Lead-Free Processable

High $T_g$ Laminating Resin using Epoxidized DCPD Phenol Novolac and a High Molecular Weight Octylphenol Novolac Curing Agent This example illustrates an improved electrical performance Lead-Free Solder processable, high $T_g$ epoxy laminating resin composed, in part, of an epoxidized DCPD Phenol Novolac polymerized using a high molecular weight Octylphenol Novolac curing agent.

An identical varnish formulation as in Example 2 was prepared, using a different Octylphenol Novolac with a Mw value of 2339, from its components according to Table 2 and the procedures described in Examples 1 and 2. The gel time of this varnish solution was 175 seconds at 171° C. As described in Examples 1 and 2, this varnish solution was used to impregnate fiberglass cloth. Each sheet of the resulting prepreg was kept in an air circulating oven for 2.75 minutes. The surface appearance of this prepreg was judged to be poor/marginal containing many craters and "orange peel". A laminate was then prepared from this prepreg and its properties can be found in Table 3.

This example illustrates the use of a high molecular weight Octylphenol Novolac curing agent in the preparation of an epoxy resin composition for improved Lead-Free solder processable, high $T_g$ electrical laminating resin applications. Its properties are similar or superior to those provided in Comparative Example 1.

TABLE 3

Results for Comparative Example 1 Along with Examples Formulated using Varying Molecular Weight Octylphenol Novolac Curing Agent, Epoxidized DCPD Phenol Novolac, EPON Resin 1163 and EPON Resin 1031

| | Example Number | | | |
|---|---|---|---|---|
| | 1 | 2 | 5 | 6 |
| Octylphenol Novolac | | | | |
| Mw | — | 1715 | 980 | 2339 |
| Composition, parts (grams) | | | | |
| EPON Resin 1163 | 30.80 | 28.34 | 28.33 | 28.34 |
| EPON Resin 1031 | 10.22 | 3.26 | 3.27 | 3.25 |
| EPON Resin 154-A-80 | 38.51 | — | — | — |
| Epoxidized DCPD Phenol Novolac Resin (Mw = 1040) | — | 28.54 | 28.52 | 28.53 |
| Phenolic Novolac (Mw = 1540) | 28.17 | — | — | — |
| Octylphenol Novolac | — | 39.86 | 39.88 | 39.87 |
| MEK | — | 22.93 | 22.83 | 22.85 |
| Acetone | 20.85 | 16.77 | 16.77 | 16.78 |
| PGME | 12.21 | 7.26 | 7.26 | 7.27 |
| 10% 2MI/90% PGME | 0.5 | 5.82 | 5.33 | 5.33 |
| Prepreg Characteristics | | | | |
| Varnish Gel Time (seconds) | 191 | 204 | 210 | 175 |

TABLE 3-continued

Results for Comparative Example 1 Along with Examples Formulated using Varying Molecular Weight Octylphenol Novolac Curing Agent, Epoxidized DCPD Phenol Novolac, EPON Resin 1163 and EPON Resin 1031

| | Example Number | | | |
|---|---|---|---|---|
| | 1 | 2 | 5 | 6 |
| Oven Time (minutes) | 3.75 | 5.25 | 5.50 | 2.75 |
| Prepreg Appearance | excellent | marginal | fair/marginal | poor/marginal |
| Laminates Characteristics | | | | |
| $T_g$ (DSC, 2nd Heat) | 157 | 183 | 163 | 166 |

Example 7

Improved Electrical Performance Lead-Free Processable

High $T_g$ Laminating Resin using Epoxidized DCPD Phenol Novolac and a Para-tertiary-Butylphenol Novolac Curing Agent This example illustrates an improved electrical performance Lead-Free Solder processable, high $T_g$ epoxy laminating resin composed, in part, of an epoxidized DCPD Phenol Novolac polymerized using a Para-tertiary-Butylphenol Novolac curing agent.

An identical varnish formulation as in Example 2 was prepared, using a Para-tertiary-Butylphenol Novolac with a Mw value of 1134, from its components according to Table 2 and the procedures described in Examples 1 and 2. The gel time of this formulation's varnish solution was 210 seconds at 171° C. As described in Examples 1 and 2, this varnish solution was used to impregnate fiberglass cloth. Each sheet of the resulting prepreg was kept in an air circulating oven for 5.50 minutes. The surface appearance of this prepreg was judged to be poor/marginal containing many craters and "orange peel". A laminate was then prepared from this prepreg and its properties can be found in Table 4.

This example illustrates the use of a Para-tertiary-Butylphenol Novolac curing agent with an epoxidized DCPD Phenol Novolac in the preparation of an epoxy resin composition for improved Lead-Free solder processable, high $T_g$ electrical laminating resin applications. Its properties are similar or superior to those provided in Comparative Example 1.

Example 8

Improved Electrical Performance Lead-Free Processable

High $T_g$ Laminating Resin using Epoxidized DCPD Phenol Novolac and a Para-Nonylphenol Novolac Curing Agent This example illustrates an improved electrical performance Lead-Free Solder processable, high $T_g$ epoxy laminating resin composed, in part, of an epoxidized DCPD Phenol Novolac polymerized using a Para-Nonylphenol Novolac curing agent.

An identical varnish formulation as in Example 2 was prepared, using a Para-Nonylphenol Novolac with a phenolic equivalent weight of 230 and a Mw value of 2488, from its components according to Table 3 and the procedures described in Examples 1 and 2. The gel time of this varnish solution was 210 seconds at 171° C. As described in Examples 1 and 2, this varnish solution was used to impregnate fiberglass cloth. Each sheet of the resulting prepreg was kept in an air circulating oven for 5.00 minutes. The surface appearance of this prepreg was judged to be good containing a few craters and a very slight "orange peel". A laminate was then prepared from this prepreg and its properties can be found in Table 4.

This example illustrates the use of a Para-Nonylphenol Novolac curing agent in the preparation of an epoxy resin composition for improved Lead-Free solder processable, high $T_g$ electrical laminating resin applications. Its properties are similar or superior to those provided in Comparative Example 1.

TABLE 4

Results for Comparative Example 1 Along with Examples Formulated using Differing Alkylphenol Novolac Curing Agents, Epoxidized DCPD Phenol Novolac, EPON Resin 1163 and EPON Resin 1031

| | Example Number | | | |
|---|---|---|---|---|
| | 1 | 2 | 7 | 8 |
| Novolac Type | Phenolic | Octyl-phenol | Para-tertiary-Butylphenol | Para-Nonyl-phenol |
| Mw | 1540 | 1715 | 1134 | 2488 |
| Composition, parts (grams) | | | | |
| EPON Resin 1163 | 30.80 | 28.34 | 28.00 | 28.02 |
| EPON Resin 1031 | 10.22 | 3.26 | 2.99 | 3.00 |
| EPON Resin 154-A-80 | 38.51 | — | — | — |
| Epoxidized DCPD Phenol Novolac Resin (Mw = 1715) | — | 28.54 | 35.17 | 25.5 |
| Phenolic Novolac | 28.17 | — | — | — |
| Octylphenol Novolac | — | 39.86 | — | — |
| Para-tertiary-Butylphenol Novolac | — | — | 33.83 | — |
| Para-Nonylphenol Novolac | — | — | — | 43.48 |
| MEK | — | 22.93 | 22.92 | 11.72 |
| Acetone | 20.85 | 16.77 | 16.83 | 24.49 |
| PGME | 12.21 | 7.26 | 7.30 | 6.65 |
| 10% 2MI/90% PGME | 0.5 | 5.82 | 4.31 | 5.35 |
| Prepreg Characteristics | | | | |
| Varnish Gel Time (seconds) | 191 | 204 | 210 | 210 |
| Oven Time (minutes) | 3.75 | 5.25 | 5.50 | 5.00 |
| Prepreg Appearance | excellent | marginal | poor/marginal | good |
| Laminates Characteristics | | | | |
| $T_g$ (DSC, 2nd Heat) | 157 | 183 | 185 | 147 |

Example 9

Improved Electrical Performance Lead-Free Processable

High $T_g$ Laminating Resin using Epoxidized DCPD Phenol Novolac and a Physical Blend of a Para-tertiary-Butylphenol Novolac and Octylphenol Novolac Curing Agent This example illustrates an improved electrical performance Lead-Free Solder processable, high $T_g$ epoxy laminating resin composed, in part, of an epoxidized DCPD Phenol Novolac polymerized using a physical blend of a Para-tertiary-Butylphenol Novolac and an Octylphenol Novolac curing agent.

An identical varnish formulation as in Example 2 was prepared, using a physical blend of a Para-tertiary-Butylphenol Novolac and an Octylphenol Novolac curing agent, from its components according to Table 4 and the procedures described in Examples 1 and 2. The gel time of this varnish solution was 210 seconds at 171° C. As described in Examples 1 and 2, this varnish solution was used to impregnate fiberglass cloth. Each sheet of the resulting prepreg was kept in an air circulating oven for 5.00 minutes. The surface appearance of this prepreg was judged to be good containing a few craters and a very slight "orange peel". A laminate was then prepared from this prepreg and its properties can be found in Table 5.

This example illustrates the use of a physical blend of a Para-tertiary-Butylphenol Novolac and an Octylphenol Novolac curing agent in the preparation of an epoxy resin composition for improved Lead-Free solder processable, high $T_g$ electrical laminating resin applications. Its properties are similar or superior to those provided in Comparative Example 1.

TABLE 5

(In Two Parts A & B)
Results for Comparative Example 1, Example 2 Along with an Example Formulated using a Physical Blend of a Para-tertiary-Butylphenol Novolac and an Octylphenol Novolac Curing Agent, Epoxidized DCPD Phenol Novolac, EPON Resin 1163 and EPON Resin 1031

| | Example Number | | | |
|---|---|---|---|---|
| | 1 | 2 | 7 | 9 |
| | A | | | |
| Novolac Type | Phenolic | Octylphenol | Para-tertiary-Butylphenol | Physical Blend of Para-tertiary-Butylphenol Novolac and Octylphenol Novolac |

TABLE 5-continued (In Two Parts A & B)
Results for Comparative Example 1, Example 2 Along with an Example Formulated using a Physical Blend of a Para-tertiary-Butylphenol Novolac and an Octylphenol Novolac Curing Agent, Epoxidized DCPD Phenol Novolac, EPON Resin 1163 and EPON Resin 1031

| | Example Number | | | |
|---|---|---|---|---|
| | 1 | 2 | 7 | 9 |
| Mw | 1540 | 1715 | 1134 | 50% Octylphenol Novolac at Mw = 1715 50% Para-tertiary-Butylphenol at Mw = 1134 |
| Composition, parts (grams) | | | | |
| EPON Resin 1163 | 30.80 | 28.34 | 28.00 | 27.99 |
| EPON Resin 1031 | 10.22 | 3.26 | 2.99 | 3.01 |
| EPON Resin 154-A-80 | 38.51 | — | — | — |
| Epoxidized DCPD Phenol Novolac Resin (Mw = 1040) | — | 28.54 | 35.17 | 32.16 |
| Phenolic Novolac | 28.17 | — | — | — |
| Octylphenol Novolac | — | 39.86 | — | 18.41 |
| Para-tertiary-Butylphenol Novolac | — | — | 33.83 | 18.43 |
| MEK | — | 22.93 | 22.92 | 22.92 |
| Acetone | 20.85 | 16.77 | 16.83 | 16.84 |
| PGME | 12.21 | 7.26 | 7.30 | 7.30 |
| 10% 2MI/90% PGME | 0.5 | 5.82 | 4.31 | 4.78 |
| | | B | | |
| Prepreg Characteristics | | | | |
| Varnish Gel Time (seconds) | 191 | 204 | 210 | 204 |
| Oven Time (minutes) | 3.75 | 5.25 | 5.50 | 5.00 |
| Prepreg Appearance | excellent | marginal | Poor/marginal | poor/marginal |
| Laminates Characteristics | | | | |
| $T_g$ (DSC, 2nd Heat) | 157 | 183 | 185 | 180 |

Example 10

Improved Electrical Performance Lead-Free Processable

High $T_g$ Laminating Resin using Epoxidized DCPD Phenol Novolac and a Co-Novolac Curing Agent Composed of Para-tertiary-Butylphenol and Octylphenol This example illustrates an improved electrical performance Lead-Free Solder processable, high $T_g$ epoxy laminating resin composed, in part, of an epoxidized DCPD Phenol Novolac polymerized using a Co-Novolac curing agent composed of Para-tertiary-Butylphenol and Octylphenol.

Figure 4:
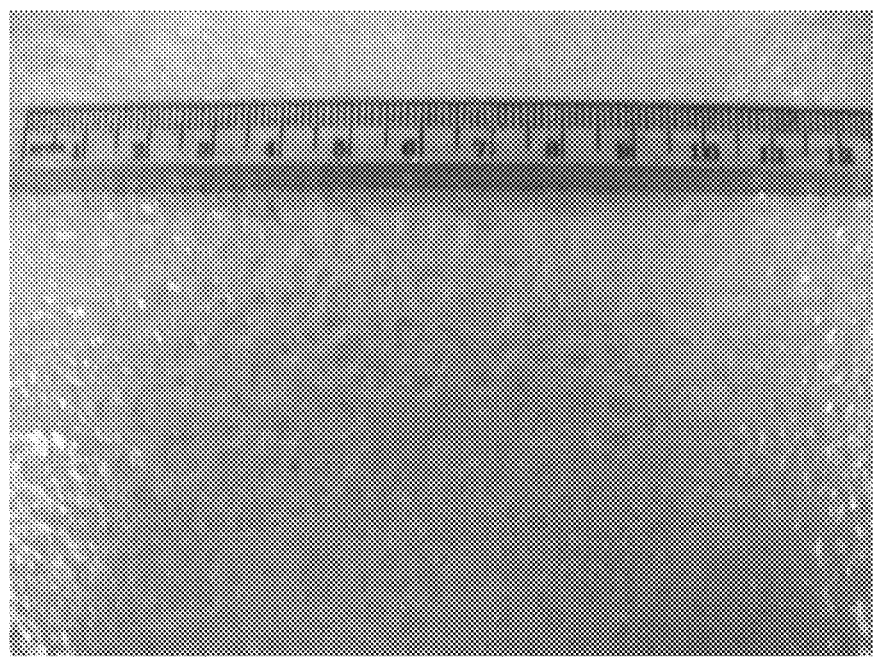
FIG. 4 is a photograph of the surface of a prepreg made using Example 10.

A similar varnish formulation as in Example 2 was prepared, using an epoxidized DCPD Phenol Novolac with a WPE of 278 and a Mw value of 1040, from its components according to Table 1 and the procedures described in Example 1. The curing agent used in this composition was a co-Novolac composed of Octylphenol and Para-tertiary-Butylphenol with a phenolic equivalent weight of 180 and a Mw value of 1404. The gel time of this formulation's varnish solution was 196 seconds at 171° C. As described in Examples 1 and 2, this varnish solution was used to impregnate fiberglass cloth. Each sheet of the resulting prepreg was kept in an air circulating oven for 5.00 minutes. The surface appearance of this prepreg was judged to be very poor containing a large number craters and a very high "orange peel". An illustrative photograph of a representative area of this prepreg's surface can be found in FIG. 4. Note that this example was prepared using no oligomeric polybutadiene and thus has a rough surface appearance. A laminate was then prepared using this prepreg and its properties can be found in Table 6.

This example illustrates the use of a physical blend of a Para-tertiary-Butylphenol Novolac and an Octylphenol Novolac curing agent in the preparation of an epoxy resin composition for improved Lead-Free solder processable, high $T_g$ electrical laminating resin applications. Its properties are similar or superior to those provided in Comparative Example 1.

TABLE 6

(In Two Parts A & B)
Results for Comparative Example 1; Along with Formulations Using epoxidized DCPD Phenol Novolac Cured by either an Octylphenol Novolac, Para-tertiary-Butylphenol Novolac, the Physical blend of Octylphenol Novolac/Para-tertiary-ButylphenolNovolac or the Co-Novolac of Para-tertiary- Butylphenol and Octylphenol

| | Example Number | | | | |
|---|---|---|---|---|---|
| | 1 | 2 | 7 | 9 | 10 |
| | A | | | | |
| Novolac Type | Phenolic | Octylphenol | Para-tertiary-Butylphenol | Physical Blend of Octylphenol Novolac and Para-tertiary-Butylphenol Novolac | Co-Novolac of Octylphenol and Para-tertiary-Butylphenol. |
| Mw | | 1715 | 1134 | — | 1404 |
| Composition, parts (grams) | | | | | |
| EPON Resin 1163 | 30.80 | 28.34 | 28.00 | 27.99 | 28.00 |
| EPON Resin 1031 | 10.22 | 3.26 | 2.99 | 3.01 | 3.00 |
| EPON Resin 154-A-80 | 38.51 | — | — | — | — |
| Epoxidized DCPD Phenol Novolac Resin (Mw = 1040) | — | 28.54 | 35.17 | 32.16 | 32.64 |
| Phenolic Novolac | 28.17 | — | — | — | — |
| Octylphenol Novolac | — | 39.86 | — | 18.41 | — |
| Para-tertiary-Butylphenol Novolac | — | — | 33.83 | 18.43 | — |
| Co-Novolac of Octylphenol and Para-tertiary-Butylphenol | — | — | — | — | 36.35 |
| MEK | — | 22.93 | 22.92 | 26.17 | 11.25 |
| Acetone | 20.85 | 16.77 | 16.83 | 13.01 | 30.84 |
| PGME | 12.21 | 7.26 | 7.30 | 7.30 | 7.53 |
| 10% 2MI/90% PGME | 0.5 | 5.82 | 4.31 | 4.78 | 4.82 |
| | B | | | | |
| Novolac Type | Phenolic | Octylphenol | Para-tertiary-Butylphenol | Physical Blend of Octylphenol Novolac and Para-tertiary-Butylphenol Novolac | Co-Novolac of Octylphenol and Para-tertiary-Butylphenol. |
| Prepreg Characteristics | | | | | |
| Varnish Gel Time (seconds) | 191 | 204 | 210 | 204 | 196.0 |
| Oven Time (minutes) | 3.75 | 5.25 | 5.50 | 5.00 | 5.00 |
| Prepreg Appearance | Excellent | fair/marginal | poor/marginal | poor/marginal | Poor |
| Laminates Characteristics | | | | | |
| $T_g$ (DSC, 2nd Heat) | 157 | 183 | 185 | 180 | 185 |

Example 11

Improved Electrical Performance Lead-Free Processable

High $T_g$ Laminating Resin using a low Molecular Weight Epoxidized DCPD Phenol Novolac, an Octylphenol Novolac Curing Agent and One Weight Percent Oligomeric Polybutadiene This example illustrates an enhanced surface appearance, improved electrical performance Lead-Free Solder processable, high $T_g$ epoxy laminating resin composed, in part, of a low molecular weight epoxidized DCPD Phenol Novolac polymerized using an Octylphenol Novolac curing agent and an oligomeric Polybutadiene at one wt %.

A varnish formulation identical to that of Example 3 was prepared from its components according to Table 7 and the procedures described in Examples 1 and 2. The curing agent used in this composition was the same Novolac as in Example 2. However, in this varnish formulation a Polybutadiene oligomeric material at one wt %, solids basis, was additionally added. The Polybutadiene had a Mw value of 8490 and a vinyl content of 70 wt %. The gel time of this varnish solution was 210 seconds at 171° C. As described in Examples 1 and 2, this varnish solution was used to impregnate fiberglass cloth. Each sheet of the resulting prepreg was kept in an air circulating oven for 4.25 minutes. The surface appearance of this prepreg was judged to be excellent containing no craters and was very smooth with no "orange peel". A laminate was then prepared from this prepreg and its properties can be found in Table 7.

Figure 5:
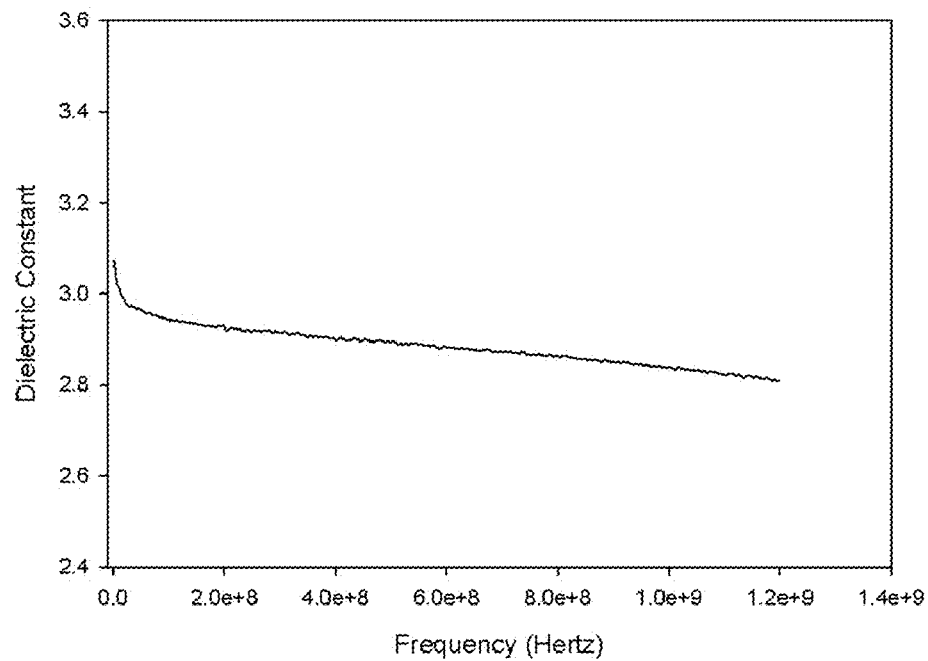
FIG. 5 is a plot of dielectric constant as a function of frequency for Example 11.
Figure 6:
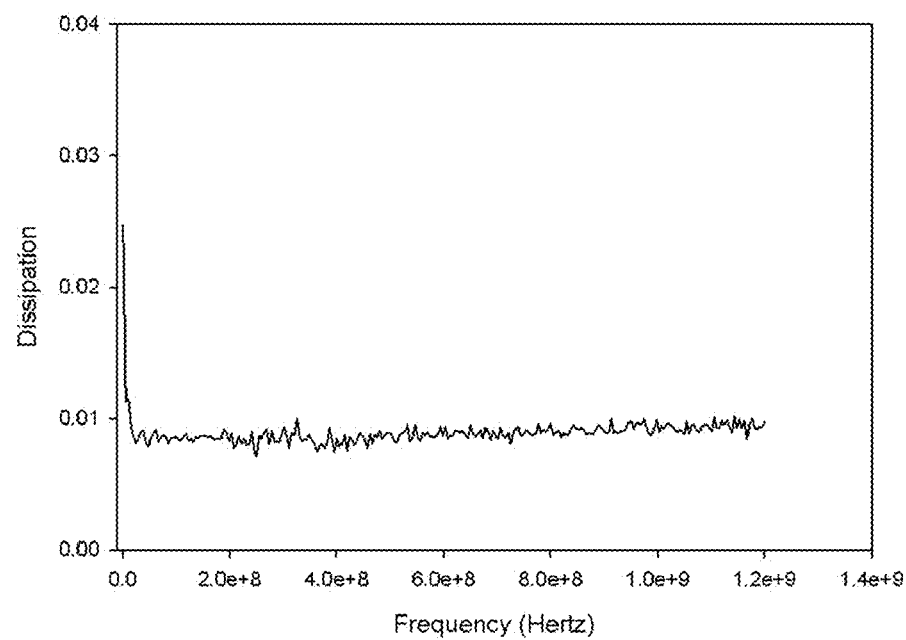
FIG. 6 is a plot of dissipation as a function of frequency for Example 11.

A cured neat resin casting was prepared from dust removed from some these prepregs, as described in Examples 1 and 2, and its dielectric constant and dissipation was measured. These measured values can be found in FIGS. 5 and 6.

This example illustrates the use of a one wt %, high vinyl content, oligomeric Polybutadiene in the epoxidized DCPD Phenol Novolac/Alkylphenol Novolac curing agent formulations to prepare enhanced surface appearance, improved Lead-Free solder processable, high $T_g$ electrical laminating resins. Its properties are similar or superior to those provided in Comparative Example 1.

Example 12

Improved Electrical Performance Lead-Free Processable

High $T_g$ Laminating Resin using a low Molecular Weight Epoxidized DCPD Phenol Novolac, an Octylphenol Novolac Curing Agent and Two Weight Percent Oligomeric Polybutadiene This example illustrates an enhanced surface appearance, improved electrical performance Lead-Free Solder processable, high $T_g$ epoxy laminating resin composed, in part, of a moderate molecular weight epoxidized DCPD Phenol Novolac polymerized using an Octylphenol Novolac curing agent and an oligomeric Polybutadiene at one wt %.

Figure 7:
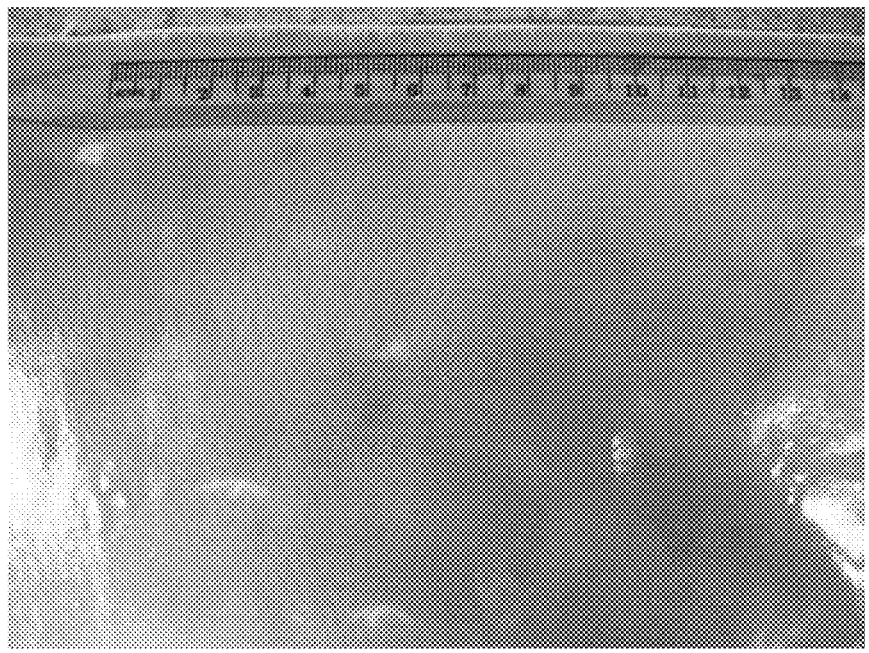
FIG. 7 is a photograph of the surface of a prepreg made using Example 12.

A varnish formulation identical to that of Example 2 was prepared from its components according to Table 8 and the procedures described in Examples 1 and 2. The curing agent used in this composition was the same Novolac as in Example 2. However, in this varnish formulation a Polybutadiene oligomeric material at one wt %, solids basis, was additionally added. The Polybutadiene had a Mw value of 8490 and a vinyl content of 70 wt %. The gel time of this varnish solution was 194 seconds at 171° C. As described in Examples 1 and 2, this varnish solution was used to impregnate fiberglass cloth. Each sheet of the resulting prepreg was kept in an air circulating oven for 5.00 minutes. The surface appearance of this prepreg was judged to be excellent containing no craters and was very smooth with no "orange peel". FIG. 7 illustrates the surface appearance of a typical area of this prepreg. A comparison of this Figure with FIG. 3 demonstrates the significant prepreg surface appearance improvement created by the addition of a high vinyl content, oligomeric Polybutadiene in epoxidized DCPD Phenol Novolac/Alkylphenol Novolac formulations. A laminate was then prepared from this prepreg and its properties can be found in Table 8.

This example illustrates the use of a one wt%, high vinyl content, oligomeric Polybutadiene with a moderate Molecular Weight epoxidized DCPD Phenol Novolac/Alkylphenol Novolac curing agent formulation to prepare enhanced surface appearance, improved Lead-Free solder processable, high $T_g$ electrical laminating resins. Its properties are similar or superior to those provided in Comparative Example 1.

TABLE 8

Results for Comparative Example 1; Low Molecular Weight (Example 3) and Moderate Molecular Weight (Example 2) Epoxidized DCPD Phenol Novolac, EPON Resin 1163 and EPON Resin 1031 Cured using an Octylphenol Novolac; and, Similar Formulations (Examples 11 and 13) Containing an Oligomeric Polybutadiene at One Weight Percent

| | Example Number | | | | |
|---|---|---|---|---|---|
| | 1 | 3 | 11 | 2 | 12 |
| Novolac Type | Phenolic | Octylphenol | Octylphenol | Octylphenol | Octylphenol |
| Epoxidized DCPD Phenol Novolac Molecular Weight | — | 523 | 523 | 1040 | 1040 |
| Oligomeric Polybutadiene Content, Weight Percent | 0 | 0 | 1.0 | 0 | 1.0 |
| Composition, parts (grams) | | | | | |
| EPON Resin 1163 | 30.80 | 28.00 | 28.00 | 28.00 | 28.34 |
| EPON Resin 1031 | 10.22 | 3.00 | 3.00 | 3.00 | 3.26 |
| EPON Resin 154-A-80 | 38.51 | — | — | — | — |
| Epoxidized DCPD Phenol Novolac Resin | — | 26.71 | 26.20 | 26.71 | 28.54 |
| Phenolic Novolac (Mw = 1540) | 28.17 | — | — | — | — |
| Octylphenol Novolac | — | 42.29 | 41.83 | 42.29 | 39.86 |
| MEK | — | 26.33 | 31.25 | 26.33 | 21.46 |
| Acetone | 20.85 | 12.49 | 4.18 | 12.49 | 23.93 |
| PGME | 12.21 | 7.31 | 6.69 | 7.31 | 7.27 |
| 10% 2MI/90% PGME | 0.5 | 5.61 | 5.65 | 5.61 | 5.81 |
| Prepreg Characteristics | | | | | |
| Varnish Gel Time (seconds) | 191 | 213 | 210 | 213 | 194 |
| Oven Time (minutes) | 3.75 | 4.50 | 5.25 | 4.50 | 5.00 |
| Prepreg Appearance | excellent | fair | excellent | fair | excellent |
| Laminates Characteristics | | | | | |
| $T_g$ (DSC, 2nd Heat) | 157 | 173 | 164 | 173 | 175 |

Example 14

Improved Electrical Performance

Figure 8:
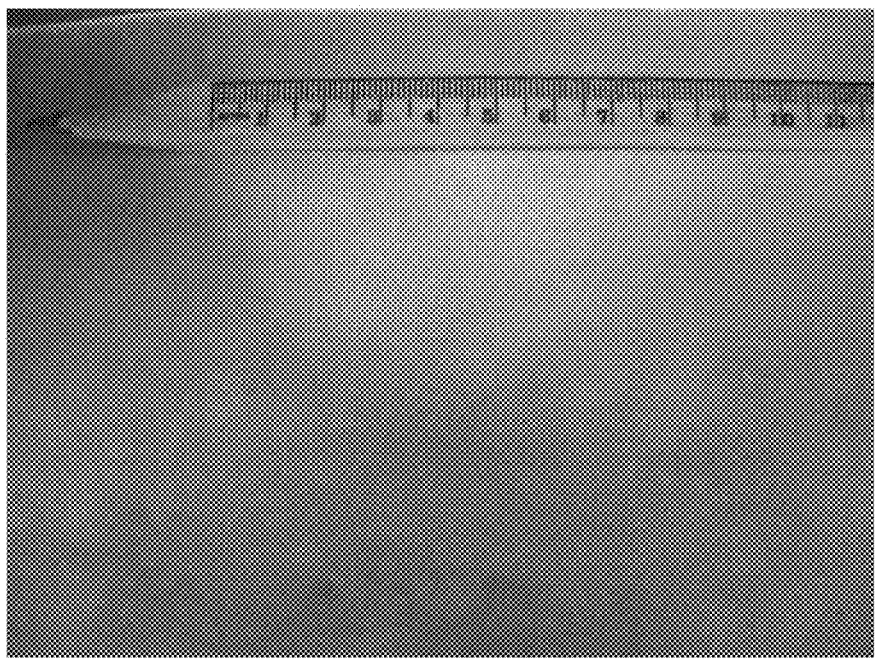
FIG. 8 is a photograph of the surface of a prepreg made using Example 14.

Lead-Free Processable, High $T_g$ Laminating Resin using an Epoxidized DCPD Phenol Novolac, EPON Resin 1163, EPON Resin 1031 and an Oligomeric Polybutadiene Cured using a Co-Novolac Composed of Para-tertiary-Butylphenol and Octylphenol A similar varnish formulation as in Example 10 was prepared, using identical components, according to Table 9 and the procedures described in Examples 1 and 2. However, in this varnish formulation a Polybutadiene oligomeric material was additionally added at one wt %, solids basis. The Polybutadiene was the same one used in Examples 11, 12 and 13. The gel time of this varnish solution was 200 seconds at 171° C. As described in Examples 1 and 2, this varnish solution was used to impregnate fiberglass cloth. Each sheet of the resulting prepreg was kept in an air circulating oven for 6.5 minutes. The surface appearance of this prepreg was judged to be very good containing no craters and a very slight "orange peel". FIG. 8 illustrates the surface appearance of a typical area of this prepreg. A comparison of this Figure with FIG. 4 demonstrates the significant prepreg surface appearance improvement created by the addition of a high vinyl content, oligomeric Polybutadiene in epoxidized DCPD Phenol Novolac/Alkylphenol Novolac formulations. A laminate was then prepared from this prepreg and its properties can be found in Table 9.

This example illustrates the use of a high vinyl content, oligomeric Polybutadiene in a moderate Molecular Weight epoxidized DCPD Phenol Novolac/Alkylphenol Co-Novolac curing agent formulations to prepare enhanced surface appearance, improved Lead-Free solder processable, high $T_g$ electrical laminating resins. Its properties are similar or superior to those provided in Comparative Example 1.

Example 15

Improved Electrical Performance Lead-Free Processable

High $T_g$ Laminating Resin using an Epoxidized DCPD Phenol Novolac, an Octylphenol Novolac Curing Agent and a Different Oligomeric Polybutadiene This example illustrates an enhanced surface appearance, improved electrical performance Lead-Free Solder processable, high $T_g$ epoxy laminating resin composed, in part, of an epoxidized DCPD Phenol Novolac polymerized using an

TABLE 9

(In Two Parts A & B)
Results for Comparative Example 1; Epoxidized DCPD Phenol Novolac, EPON Resin 1163 and EPON Resin 1031 Cured using a Co-Novolac of Octylphenol and Para-tertiary-Butylphenol; and, a Similar Formulation Containing an Oligomeric Polybutadiene at One Weight Percent

| | Example Number | | | |
|---|---|---|---|---|
| | 1 | 12 | 10 | 14 |
| A | | | | |
| Novolac Type | Phenolic | Octylphenol | Co-Novolac of Octylphenol and Para-tertiary-Butylphenol | Co-Novolac of Octylphenol and Para-tertiary-Butylphenol |
| Oligomeric Polybutadiene Content, Weight Percent | 0 | 1.0 | 0 | 1.0 |
| Composition, parts (grams) | | | | |
| EPON Resin 1163 | 30.80 | 28.00 | 28.00 | 28.00 |
| EPON Resin 1031 | 10.22 | 3.00 | 3.00 | 3.00 |
| EPON Resin 154-A-80 | 38.51 | — | — | — |
| Epoxidized DCPD Phenol Novolac Resin (Mw = 1715) | — | 25.64 | 32.64 | 32.68 |
| Phenolic Novolac (Mw = 1540) | 28.17 | — | — | — |
| Octylphenol Novolac (Mw = 1715) | — | 41.35 | — | — |
| Co-Novolac of Para-tertiary-Butylphenol and Octylphenol (Mw = 1404) | — | — | 36.35 | 36.38 |
| MEK | — | 18.10 | 11.25 | 11.26 |
| Acetone | 20.85 | 13.81 | 30.84 | 30.85 |
| PGME | 12.21 | 6.65 | 7.53 | 7.53 |
| 10% 2MI/90% PGME | 0.5 | 5.76 | 4.82 | 4.70 |
| B | | | | |
| Novolac Type | Phenolic | Octylphenol | Co-Novolac of Octylphenol and Para-tertiary-Butylphenol | Co-Novolac of Octylphenol and Para-tertiary-Butylphenol |
| Prepreg Characteristics | | | | |
| Varnish Gel Time (seconds) | 191 | 223 | 196.0 | 200 |
| Oven Time (minutes) | 3.75 | 5.50 | 5.00 | 4.70 |
| Prepreg Appearance | excellent | excellent | poor | excellent |
| Laminates Characteristics | | | | |
| $T_g$ (DSC, 2nd Heat) | 157 | 167 | 185 | 175 |

Octylphenol Novolac Curing agent and also containing an oligomeric Polybutadiene different than the one used in Examples 11, 12, 13 and 14.

A similar varnish formulation as in Example 2 was prepared, using identical components, according to Table 10 and the procedures described in Examples 1 and 2. However, in this varnish formulation a Polybutadiene oligomeric material was additionally added. The Polybutadiene was different than the one used in Examples 11, 12, 13 and 14. This Polybutadiene had a Mw value of 15441 and a vinyl content of 90 wt%.

This example illustrates the use of a high vinyl content, oligomeric Polybutadiene (different from that used in Examples 11, 12, 13 or 14) in the epoxidized DCPD Phenol Novolac/Alkylphenol Novolac curing agent formulations to prepare enhanced surface appearance, improved Lead-Free solder processable, high $T_g$ electrical laminating resins. Its properties are similar or superior to those provided in Comparative Example 1.

TABLE 10

(In Two Parts A & B)
Results for Comparative Example 1; Epoxidized DCPD Phenol Novolac, EPON Resin 1163 and EPON Resin 1031 Cured using an Octylphenol Novolac; and, Similar Formulations Containing Two Different Oligomeric Polybutadienes

| | Example Number | | | |
|---|---|---|---|---|
| | 1 | 3 | 12 | 14 |
| A | | | | |
| Novolac Type | Phenolic | Co-Novolac of Para-tertiary-Butylphenol and Octylphenol | Co-Novolac of Para-tertiary-Butylphenol and Octylphenol | Co-Novolac of Para-tertiary-Butylphenol and Octylphenol |
| Oligomeric Polybutadiene Type | — | — | #1 | #2 |
| Composition, parts (grams) | | | | |
| EPON Resin 1163 | 30.80 | 28.00 | 28.00 | 28.00 |
| EPON Resin 1031 | 10.22 | 3.00 | 3.00 | 3.00 |
| EPON Resin 154-A-80 | 38.51 | — | — | — |
| Epoxidized DCPD Phenol Novolac Resin (Mw = 1715) | — | 26.71 | 25.64 | 26.17 |
| Phenolic Novolac (Mw = 1540) | 28.17 | — | — | — |
| Co-Novolac of Para-tertiary-Butylphenol and Octylphenol Novolac (Mw = 1404) | — | 42.29 | 41.35 | 41.84 |
| MEK | — | 26.33 | 18.10 | 22.53 |
| Acetone | 20.85 | 12.49 | 13.81 | 12.92 |
| PGME | 12.21 | 7.31 | 6.65 | 6.65 |
| 10% 2MI/90% PGME | 0.5 | 5.61 | 5.76 | 5.65 |
| B | | | | |
| Novolac Type | Phenolic | Co-Novolac of Para-tertiary-Butylphenol and Octylphenol | Co-Novolac of Para-tertiary-Butylphenol and Octylphenol | Co-Novolac of Para-tertiary-Butylphenol and Octylphenol |
| Oligomeric Polybutadiene Type | — | — | #1 | #2 |
| Prepreg Characteristics | | | | |
| Varnish Gel Time (seconds) | 191 | 213 | 223 | 221 |
| Oven Time (minutes) | 3.75 | 4.50 | 5.50 | 5.50 |
| Prepreg Appearance | excellent | fair | excellent | Excellent |
| Laminates Characteristics | | | | |
| $T_g$ (DSC, 2nd Heat) | 157 | 173 | 167 | 165 |

The gel time of this varnish solution was 221 seconds at 171° C. As described in Examples 1 and 2, this varnish solution was used to impregnate fiberglass cloth. Each sheet of the resulting prepreg was kept in an air circulating oven for 4.50 minutes. The surface appearance of this prepreg was judged to be excellent containing no craters and a very slight "orange peel". A laminate was then prepared from this prepreg and its properties can be found in Table 10.

The invention claimed is:

1. A composite prepared using a thermosettable epoxy resin composition, the thermosettable epoxy resin composition having been prepared using formulation components comprising:
   an epoxy resin;
   an epoxidized cycloaliphatic dicyclopentadiene phenolic resin;

an alkylphenol novolac resin; and
an oligomeric butadiene homopolymer having a weight average molecular weight (Mw) of from about 1,000 to about 20,000 Daltons,
wherein the alkylphenol novolac resin serves as a curing agent.

2. The composite of claim 1 wherein the formulation components used to prepare the thermosettable epoxy resin additionally comprise an epoxidized bisphenol-A novolac resin.

3. The composite of claim 1 wherein the epoxy resin is present, as a weight percentage of all formulation components, from about 30 wt % to about 80 wt %.

4. The composite of claim 1 wherein epoxidized cycloaliphatic dicyclopentadiene phenolic resin utilized in the composition is produced from an epihalohydrin and a dicyclopentadiene polyphenolic compound having the general formula:

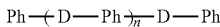

wherein "n" represents a whole number from 0 to 7; Ph is a phenylol radical derived from mononuclear phenol, and D is a tricyclodecylene radical having a general formula:

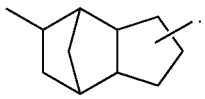

5. The composite of claim 4 wherein the epoxidized cycloaliphatic dicyclopentadiene phenolic resin is present, as a weight percentage of all formulation components, from about 5 wt % to about 70 wt %.

6. The composite of claim 2 wherein the epoxidized bisphenol-A novolac resin component is present, as a weight percentage of all formulation components, from about 10 wt % to about 40 wt %.

7. The composite of claim 1 wherein the oligomeric butadiene component is present, as a weight percentage of all formulation components, from about 0.05 wt % to about 4 wt %.

8. The composite of claim 1 wherein the formulation components further comprise a solvent component, and the solvent component is present, as a weight percentage of all formulation components, from about 15 wt % to about 50 wt %.

9. The composite of claim 1 wherein the alkylphenol novolac resin serving as the curing agent has the general formula:

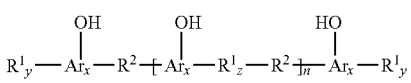

where:
Ar represents an aryl or alkyl-aryl group;
each Ar group contains x number of non-aromatic carbon atoms,
OH represents a hydroxyl group bonded to each Ar group,
each $R^1$ represents substituent group(s) bonded to each Ar group,
each $R^2$ represents a group connecting adjacent Ar groups,
n is a number between 2 and 20,
x is an integer from 4 to 8,
y is an integer from 1 to x−2, and
z is an integer from 1 to x−3.

10. The composite of claim 9 wherein the alkylphenol novolac resin serving as the curing agent has the general formula:

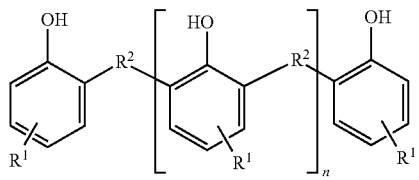

wherein:
$R^1$ represents a single alkyl substituent in the para position having from 4 to 9 carbon atoms and is sometimes a butyl or octyl group and $R^2$ is a methylene group.

11. The composite of claim 10 wherein a ratio of the total epoxy groups to the phenolic hydroxyl equivalents is between about 0.5 to about 1.5.

12. The composite of claim 1 wherein the oligomeric butadiene homopolymer comprises a 1, 2 vinyl group content from 25 to about 99 percent.

13. The composite of claim 1 wherein the formulation components, when cured, have a $T_g$ of about 150° C. or greater and a $T_d$ of 300° C. or greater.

14. A prepreg prepared using a thermosettable epoxy resin composition, the thermosettable epoxy resin composition having been prepared using formulation components comprising:
an epoxy resin;
an epoxidized cycloaliphatic dicyclopentadiene phenolic resin;
an epoxidized bisphenol A novolac resin;
an oligomeric butadiene homopolymer; and
an alkylphenol novolac resin,
wherein the alkylphenol novolac resin serves as a curing agent.

15. The prepreg of claim 14 wherein the epoxy resin is present, as a weight percentage of all formulation components, from about 30 wt % to about 80 wt %.

16. The prepreg of claim 14 wherein the epoxidized cycloaliphatic dicyclopentadiene phenolic resin is present, as a weight percentage of all formulation components, from about 5 wt % to about 70 wt %.

17. The prepreg of claim 14 wherein the epoxidized bisphenol-A novolac resin component is present, as a weight percentage of all formulation components, from about 10 wt % to about 40 wt %.

18. The prepreg of claim 14 wherein the oligomeric butadiene component is present, as a weight percentage of all formulation components, from about 0.05 wt % to about 4 wt %.

19. A laminate comprising the prepreg of claim 14.

* * * * *